United States Patent [19]

Surman et al.

[11] Patent Number: 5,514,460
[45] Date of Patent: May 7, 1996

[54] BIAXIALLY ORIENTED FILM WITH VOIDED BASELAYER

[75] Inventors: Edward D. Surman, Swindon; David Williamson, Macclesfield, both of England

[73] Assignee: Courtaulds Films (Holdings) Limited, England

[21] Appl. No.: 253,169

[22] Filed: Jun. 2, 1994

[30] Foreign Application Priority Data

Jul. 12, 1993 [GB] United Kingdom .................. 9314365

[51] Int. Cl.$^6$ .............................. B32B 3/26; B32B 27/20
[52] U.S. Cl. .................................. 428/304.4; 428/307.3; 428/308.4; 428/349; 428/516; 428/518; 428/520; 428/910; 428/315.7
[58] Field of Search ..................... 428/516, 910, 428/316.6, 349, 304.4, 518, 520, 308.4, 315.7

[56] References Cited

U.S. PATENT DOCUMENTS

| | | | |
|---|---|---|---|
| 4,377,616 | 3/1983 | Ashcraft et al. | 428/213 |
| 4,578,297 | 3/1986 | Duncan | 428/35 |
| 4,582,753 | 4/1986 | Duncan | 428/317.9 |
| 4,701,369 | 10/1987 | Duncan | 428/313.9 |
| 4,704,323 | 11/1987 | Duncan et al. | 428/286 |
| 4,720,416 | 1/1988 | Duncan | 428/195 |
| 5,091,236 | 2/1992 | Keller et al. | 428/213 |
| 5,178,942 | 1/1993 | Frognet et al. | 428/317.9 |
| 5,318,834 | 6/1994 | Foulkes et al. | 428/304.4 |

FOREIGN PATENT DOCUMENTS

| | | | |
|---|---|---|---|
| 0083495 | 7/1983 | European Pat. Off. | B44F 9/10 |
| 0388086 | 9/1990 | European Pat. Off. | B32B 27/20 |
| 0435626 | 7/1991 | European Pat. Off. | B32B 27/20 |
| 0545650 | 6/1993 | European Pat. Off. | B32B 27/32 |
| 0546741 | 6/1993 | European Pat. Off. | B32B 27/32 |
| 2150881 | 7/1985 | United Kingdom | B32B 5/18 |
| 2262062 | 6/1993 | United Kingdom | B32B 27/32 |
| 2262063 | 6/1993 | United Kingdom | B32B 27/32 |
| WO89/08023 | 9/1989 | WIPO | B32B 3/26 |
| WO93/04860 | 3/1993 | WIPO | B32B 27/18 |

*Primary Examiner*—P. C. Sluby
*Attorney, Agent, or Firm*—Bacon & Thomas

[57] ABSTRACT

Biaxially oriented film including a voided base layer consisting of a propylene homopolymer and a particulate voiding agent, and a non-voided outer layer of propylene homopolymer coextensive with the voided base layer, the particular voiding agent having a mean particle size of not more than 2 μm. Such films have good opacity combined with good gloss for the surface of the non-voided outer layer of propylene homopolymer on the base layer.

5 Claims, No Drawings

BIAXIALLY ORIENTED FILM WITH VOIDED BASELAYER

BACKGROUND OF THE INVENTION

1. Field of the Invention

This invention concerns polymeric films and more particularly polypropylene films having good opacity and gloss.

2. Description of the Prior Art

Polypropylene films can be made opaque by including an opacifying pigment and/or by including a particulate. material in the polymer used to form the films and which gives rise to opacifying voids within the films when they are stretched. Typically chalk having a mean particle size of about 3 µm is used to induce opacifying voids, stretching usually being effected biaxially and sequentially in the longitudinal and transverse directions.

Voided polypropylene films are usually provided with one more outer heat sealable layers. In addition to imparting heat sealability, heat seal layers do tend to improve the surface gloss of voided films, but their gloss is often poor compared with that of analogous non-voided films.

The gloss of voided films can, however, be improved by the inclusion of a layer of non-voided polypropylene homopolymer between the voided layer, which is usually the core layer of the film, and the outer heat seal layer. The disadvantage of doing so is, though, that-the opacity of the resultant films is relatively poor because the voided layer represents a smaller proportion of the total film thickness, and the yield of film, i.e. the area of film of a given thickness derived from a given weight of polymer, is reduced. The addition of a pigment, for example titanium,dioxide, to the voided layer or to the non-voided layer can increase the opacity of the films, but it does not increase film yield.

More recently films have been proposed which are said to have good gloss combined with high opacity by the use of chalk having a particle size of 1–2 µm as the voiding agent, the films having outer heat seal layers and intermediate layers of polypropylene homopolymer. However, the yield of film is relatively low compared with films which don't include the intermediate layers, but omitting the intermediate layers leads to reduced gloss.

SUMMARY OF THE INVENTION

According to the present invention there is provided a biaxially oriented film comprising a voided base layer comprising a propylene homopolymer and a particulate voiding agent, and a non-voided outer layer of propylene homopolymer, coextensive with the voided base layer, the particulate voiding agent having a mean particle size of not more than 2 µm.

Films in accordance with the present invention have exhibited high opacity combined with good gloss for the surface of the non-voided outer layer of propylene homopolymer on the base layer.

DETAILED DESCRIPTION OF THE PREFERRED EMBODIMENTS

Particularly good opacity is achieved by reducing the particle size of the voiding agent, provided the particles of the agent are sufficient to induce voiding. A preferred mean particle size is about 1 µm.

The particular voiding agent which is used is not believed to be important, and any of the hitherto proposed voiding agents can be used. Thus the voiding agent can be an organic or an inorganic particulate material, for example a polyester or a polyamide, or chalk.

The amount of voiding agent which is used can be varied as desired. Typically the amount used will be in the range of from 1 to 25 percent by weight of the base layer, although larger amounts can be used if very high degrees of voiding are required. A particularly preferred range for the amount of voiding agent in the base layer is from 5 to 15 percent by weight.

If desired, the base layer can include one or more opacifying pigments. Examples of opacifying pigments which can be used and which serve to increase the optical density of the films of the present invention without necessarily forming opacifying voids, include titanium dioxide, barium sulfate etc. In general it is preferred that the opacifying pigment is a particulate material having a mean particle size of less than 1 µm and preferably less than 0.5 µm. However, a particulate voiding agent which itself performs the function of a pigment can be used to effect both voiding and pigmentation of the base layer, examples of such voiding agents being calcium carbonate and polybutyleneterephthalate.

The non-voided propylene homopolymer outer layer should be coextensive with the voided layer. Furthermore, this layer should be thick enough that surface irregularities on the base layer do not adversely affect the specular gloss of the outer homopolymer layer. Typically the outer homopolymer layer will be at least 1 µm thick. However, thick outer layers of propylene hompolymer can increase the density of the films to an undesirable extent, and it is generally preferred that they have a thickness of not more than 5 µm, a preferred thickness being about 3 µm. In general it is preferred that the outer hompolymer layer does not contain a pigment as this tends to reduce the specular Gloss of this layer.

The surface of the base layer remote from the outer layer of non-voided propylene hompolymer preferably has a further polymeric layer thereon. This further polymeric layer can be a further layer of a non-voided propylene hompolymer, for example as is used for the specified non-voided homopolymer layer, or it can be a layer of a heat sealable polymer, for example containing units derived from at least two of ethylene, propylene and but-1-ene.

The following Examples are given by way of illustration only.

EXAMPLE 1

A three-layer polymeric web was produced by coextruding through a slot die a central core layer of essentially isotactic propylene hompolymer containing 6 percent by weight of particulate chalk having a mean particle size of 1 µm and 3 percent by weight of titanium dioxide having a mean particle size of 0.1 µm, a layer of the hompolymer without the chalk or titanium dioxide on one surface of the core layer, and a layer of a propylene/ethylene copolymer (4 percent of units derived from ethylene) on the other surface of the core layer.

The three layer web was then stretched 4.5 times in the direction of extrusion by passing it over heated rollers rotating at different peripheral speeds and then 10 times transversely using a stenter oven.

The biaxially stretched film leaving the stenter oven was cooled, the surface of the film formed by the unfilled homopolymer layer was subjected to corona discharge treatment to increase its surface energy, and the film was wound up. The film had a total thickness of 41 μm with the copolymer outer layer being 1.5 μm thick and the homopolymer outer layer being 3 μm thick.

The density (g/cm$^3$), optical density and specular gloss (ASTM D523-85 at 20°) of the film were then measured, the results being given in the accompanying table.

Similar biaxially oriented films were produced having thicknesses of 53 μm and 62 μm, and the density, optical density and specular gloss of these films, which had outer layers of the same thickness as those of the 41 μm thick film, were measured and are given in the accompanying table.

EXAMPLE 2 (comparison)

The method of Example 1 was repeated except that the particulate chalk used in the core layer had a mean particle size of 3 μm instead of the 1 μm of Example 1, and the films produced had the overall thicknesses given in the accompanying table (outer layers all as for Example 1).

The physical properties measured for these are given in the accompanying table.

TABLE

| Example | Film Gauge (μm) | Density (g/cm$^3$) | Optical Density | Specular Gloss Co-polymer | Homo-polymer |
|---|---|---|---|---|---|
| 1 | 41 | 0.73 | 0.72 | 10 | 62 |
| 2 (comp) | 45 | 0.69 | 0.65 | 10 | 35 |
| 1 | 53 | 0.73 | 0.80 | 10 | 59 |
| 2 (comp) | 52 | 0.70 | 0.68 | 9 | 37 |
| 1 | 62 | 0.74 | 0.80 | 10 | 60 |
| 2 (comp) | 60 | 0.75 | 0.70 | 10 | 35 |

The optical densities of the films in accordance with the present invention (Example 1) were considerably higher than those of the comparison films of comparable overall thickness. In addition, the specular gloss of the homopolymer outer layers of the films in accordance with the invention was substantially higher than that measured for the homopolymer outer layers of the comparison films. It is also noted that the specular gloss of the copolymer outer layers of these films were the same or substantially unaltered as a result of changing the particle size of the voiding agent in the core layer.

The outer homopolymer layers of all of the films of Examples 1 and 2 were printable, and the copolymer layers were heat sealable to themselves at a temperature of 125° C.

We claim:

1. A biaxially oriented film consisting essentially of a voided base layer consisting essentially of a polypropylene homopolymer and a particulate voiding agent, and a non-voided outer layer consisting essentially of propylene homopolymer directly adhered to the voided base layer, the particulate voiding agent having a mean particle size of not more than 2 μm.

2. A film according to claim 1, wherein the mean particle size of the voiding agent is about 1 μm.

3. A film according to claim 1, wherein the said non-voided outer layer is on one surface of the base layer and the base layer has a heat sealable layer on its other surface.

4. A film according to claim 3, wherein the heat sealable layer comprises a copolymer containing units derived from at least two of ethylene, propylene and but-1-ene.

5. A film according to claim 1, wherein said voided base layer contains one or more opacifying pigments.

* * * * *